(12) United States Patent
Julos et al.

(10) Patent No.: US 8,409,386 B1
(45) Date of Patent: Apr. 2, 2013

(54) STORAGE TANK ASSEMBLIES AND METHODS FOR WATER ON WATER REVERSE OSMOSIS SYSTEMS

(75) Inventors: John Jay Julos, Reno, NV (US); Timothy Allen Beall, Kernville, CA (US)

(73) Assignee: Next-RO, Inc., Kernville, CA (US)

( * ) Notice: Subject to any disclaimer, the term of this patent is extended or adjusted under 35 U.S.C. 154(b) by 38 days.

(21) Appl. No.: 13/032,512

(22) Filed: Feb. 22, 2011

Related U.S. Application Data

(60) Provisional application No. 61/306,871, filed on Feb. 22, 2010.

(51) Int. Cl.
*F16L 55/04* (2006.01)

(52) U.S. Cl. ........ 156/145; 156/146; 156/147; 156/292; 156/308.2; 156/309.9; 156/322; 156/304.1; 156/70; 156/73.5; 220/4.12; 220/495.01; 220/23.83

(58) Field of Classification Search .................. 156/145, 156/146, 147, 292, 308, 4, 308.2, 309.6, 156/309.9, 322, 304.1, 70, 73.5; 220/4.12, 220/495.01, 23.83
See application file for complete search history.

(56) References Cited

U.S. PATENT DOCUMENTS

| | | | |
|---|---|---|---|
| 2,061,604 A * | 11/1936 | Winterbauer | ................ 473/605 |
| 2,299,611 A | 10/1942 | Clark | |
| 2,343,320 A | 3/1944 | Parker | |
| 2,349,321 A | 5/1944 | White | |
| 2,349,322 A | 5/1944 | White | |
| 2,360,590 A | 10/1944 | Schweller | |
| 2,380,866 A | 7/1945 | Overbeke | |
| 2,387,598 A | 10/1945 | Mercier | |
| 2,389,791 A | 11/1945 | Lippincott | |
| 2,389,792 A | 11/1945 | Lippincott | |
| 2,390,319 A | 12/1945 | Overbeke | |
| 2,394,401 A | 2/1946 | Overbeke | |
| 2,397,248 A | 3/1946 | De Kiss | |
| 2,991,885 A | 7/1961 | Gutkowski | |
| 3,232,318 A | 2/1966 | Mercier | |
| 3,365,061 A | 1/1968 | Bray | |
| 3,406,722 A | 10/1968 | Ruth | |
| 3,493,496 A | 2/1970 | Bray et al. | |
| 3,504,796 A | 4/1970 | Bray | |
| 3,506,037 A | 4/1970 | Hanson et al. | |

(Continued)

FOREIGN PATENT DOCUMENTS

| | | |
|---|---|---|
| DE | 3642882 A1 | 6/1988 |
| DE | 3706705 | 9/1988 |

(Continued)

*Primary Examiner* — Jeff Aftergut
*Assistant Examiner* — Jaeyun Lee
(74) *Attorney, Agent, or Firm* — Blakely Sokoloff Taylor & Zafman LLP

(57) ABSTRACT

Storage tank assemblies and methods for water on water reverse osmosis systems. A bladder type storage tank is fabricated by forming first and second shells, which when joined together at a center region of each shell, form a tank enclosure, the first shell having first and second openings therein away from the center region of the respective shell, coupling a bladder to the first opening in the first shell so that the bladder will be within the tank enclosure when the first and second shells are joined together at a center region of each shell, temporarily holding the bladder in a collapsed state away from the center region of the first shell with one or more strings and passing the strings through the second opening, welding the first and second shells together at the center region of each shell to form the tank enclosure, and withdrawing the strings to release the bladder.

14 Claims, 5 Drawing Sheets

U.S. PATENT DOCUMENTS

| | | | |
|---|---|---|---|
| 3,520,437 A | 7/1970 | Fleming, Jr. et al. |
| 3,720,235 A | 3/1973 | Schrock |
| 3,760,951 A | 9/1973 | Mansfield |
| 3,844,744 A | 10/1974 | Hausberg et al. |
| 4,176,063 A | 11/1979 | Tyler |
| 4,299,254 A | 11/1981 | Zahid |
| D273,976 S | 5/1984 | Burrows |
| D273,977 S | 5/1984 | Burrows |
| D274,452 S | 6/1984 | Burrows |
| 4,482,456 A | 11/1984 | Grayson |
| 4,552,656 A | 11/1985 | Solomon |
| 4,585,554 A | 4/1986 | Burrows |
| 4,595,497 A | 6/1986 | Burrows |
| 4,657,674 A | 4/1987 | Burrows |
| 4,705,625 A | 11/1987 | Hart, Jr. |
| 4,743,366 A | 5/1988 | Burrows |
| 4,775,465 A | 10/1988 | Burrows |
| 4,776,952 A | 10/1988 | Burrows |
| 4,784,181 A | 11/1988 | Hilverdink |
| 4,830,744 A | 5/1989 | Burrows |
| 4,834,873 A | 5/1989 | Burrows |
| 4,853,117 A | 8/1989 | Burrows |
| 4,859,320 A | 8/1989 | Beall, Jr. |
| 4,880,534 A | 11/1989 | Burrows |
| 4,895,654 A | 1/1990 | Burrows |
| 4,971,689 A | 11/1990 | Burrows |
| 4,990,248 A | 2/1991 | Brown et al. |
| 4,992,170 A | 2/1991 | Menon et al. |
| 5,002,664 A | 3/1991 | Clack et al. |
| 5,037,547 A | 8/1991 | Burrows |
| 5,045,197 A | 9/1991 | Burrows |
| 5,078,864 A | 1/1992 | Whittier |
| 5,096,574 A | 3/1992 | Birdsong et al. |
| 5,114,572 A | 5/1992 | Hunter et al. |
| 5,122,265 A | 6/1992 | Mora et al. |
| 5,128,035 A | 7/1992 | Clack et al. |
| 5,132,017 A | 7/1992 | Birdsong et al. |
| 5,143,601 A | 9/1992 | Slovak et al. |
| 5,192,004 A | 3/1993 | Burrows |
| 5,221,473 A | 6/1993 | Burrows |
| 5,246,141 A | 9/1993 | Burrows |
| 5,254,243 A | 10/1993 | Carr et al. |
| 5,289,951 A | 3/1994 | Burrows |
| 5,297,700 A | 3/1994 | Burrows et al. |
| 5,307,958 A | 5/1994 | Burrows |
| 5,310,088 A | 5/1994 | Burrows |
| 5,370,276 A | 12/1994 | Burrows |
| 5,389,260 A | 2/1995 | Hemp et al. |
| 5,390,826 A | 2/1995 | Burrows |
| 5,435,909 A | 7/1995 | Burrows |
| 5,449,093 A | 9/1995 | Burrows |
| 5,527,450 A | 6/1996 | Burrows |
| 5,580,444 A | 12/1996 | Burrows |
| 5,672,272 A | 9/1997 | Baer |
| 5,766,453 A | 6/1998 | Morellato et al. |
| 5,906,225 A | 5/1999 | Stark et al. |
| 5,976,363 A | 11/1999 | Monroe et al. |
| 6,076,557 A | 6/2000 | Carney |
| 6,099,735 A | 8/2000 | Kelada |
| 6,110,360 A | 8/2000 | Hart, Jr. |
| 6,290,856 B1 | 9/2001 | Beall |
| 6,764,595 B1 | 7/2004 | Halemba et al. |
| 6,814,876 B1 | 11/2004 | Neal |
| 7,070,695 B2 | 7/2006 | Husain et al. |
| 7,601,256 B2 | 10/2009 | Beall |
| 2004/0104157 A1 | 6/2004 | Beeman et al. |
| 2004/0173624 A1 | 9/2004 | Carter |
| 2005/0139530 A1 | 6/2005 | Heiss |
| 2005/0167352 A1 | 8/2005 | Burrows et al. |
| 2006/0000839 A1 | 1/2006 | Gremour et al. |
| 2006/0113240 A1 | 6/2006 | Burrows et al. |
| 2007/0045165 A1 | 3/2007 | Beall |

FOREIGN PATENT DOCUMENTS

| | | |
|---|---|---|
| DE | 4444350 A1 | 6/1996 |
| GB | 2264684 A | 9/1993 |
| JP | 64-30901 | 2/1989 |
| SU | 386156 | 6/1973 |
| SU | 1089305 | 4/1984 |

* cited by examiner

STORAGE TANK ASSEMBLIES AND METHODS FOR WATER ON WATER REVERSE OSMOSIS SYSTEMS

CROSS-REFERENCE TO RELATED APPLICATIONS

This application claims the benefit of U.S. Provisional Patent Application No. 61/306,871 filed Feb. 22, 2010.

BACKGROUND OF THE INVENTION

1. Field of the Invention

The present invention relates to methods of manufacture of reverse osmosis product water storage tanks.

2. Prior Art

U.S. Pat. No. 7,601,256 discloses reverse osmosis filtration systems, the disclosure of which is hereby incorporated by reference. That system is what is referred to as a water on water system, in that a product water storage tank with a bladder therein is used, with the bladder being pressurized by squeeze water on the opposite side of the bladder during dispensing of the product water. The system uses a storage tank 20 as shown in FIG. 1, formed by upper and lower injection molded plastic half shells, which are then welded together at the mid-section of the tank, such as by spin welding or by hot plate welding. An opening at the top of the tank 20 receives an assembly, generally indicated by the numeral 22, which includes a product water tube 24 and ports in region 26 for squeeze water ingress and egress.

The bladder in tank 20 is fastened to product water tube 24, and in one embodiment is a flexible plastic member having a thickness of approximately 0.030 inches. The problem, however, is that since the product water tube 24 is fastened to the bladder, either the bladder must sufficiently collapse to be passed through the opening that assembly 22 is pressed into after the two shells are welded together to form tank 20, or alternatively, the bladder must be in the tank when the two shells are welded together. Forcing the bladder through the opening at the top of the tank after the shells are welded together without damage to the bladder is either impossible or not likely, and of course having the bladder within the tank when the two shells are welded together also involves a danger to the bladder because of the heat of the welding process.

DETAILED DESCRIPTION OF THE PREFERRED EMBODIMENTS

Figure 2:
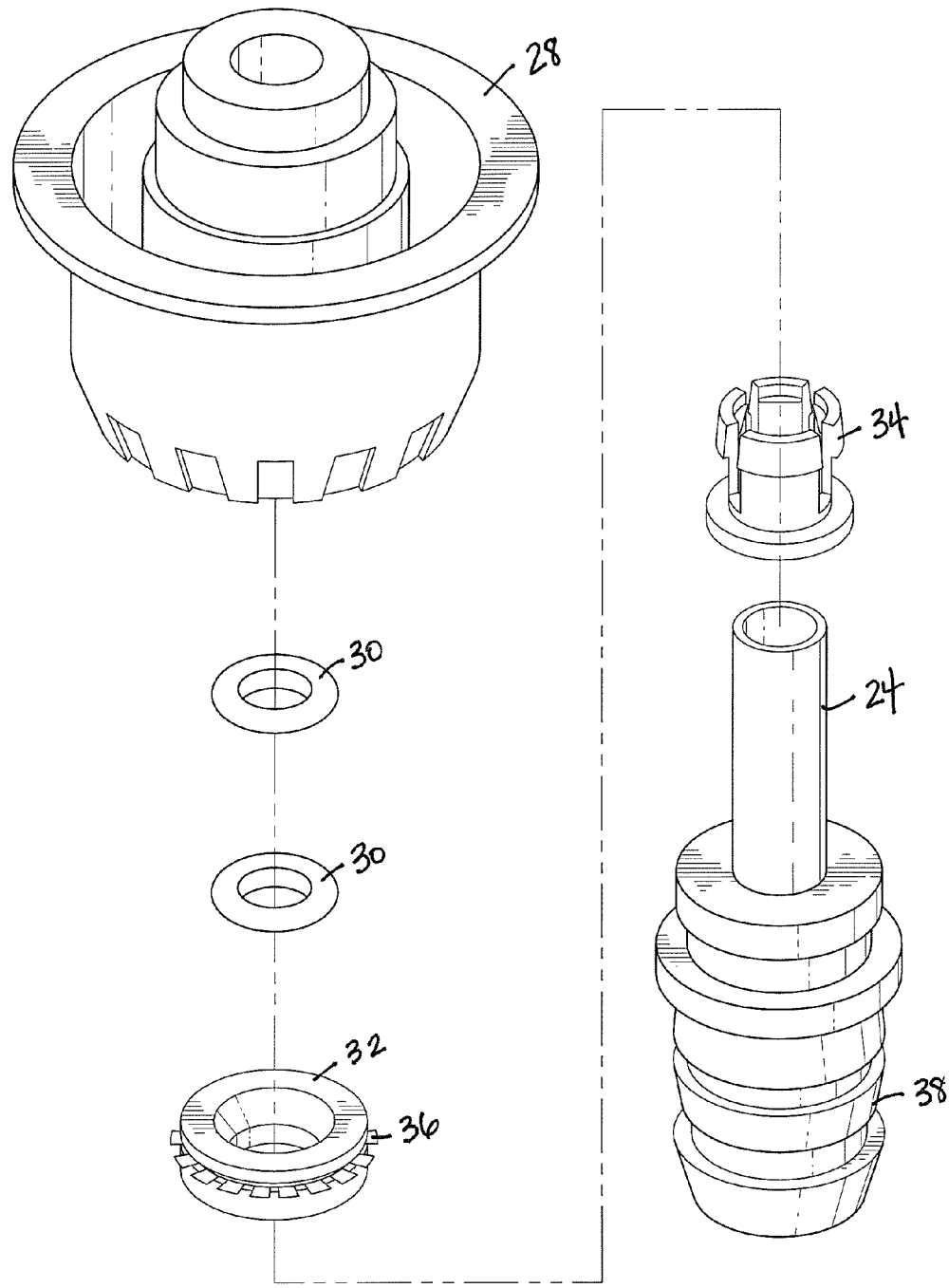
FIG. 2 is an exploded view of the top assembly of the tank of FIG. 1.
Figure 5:
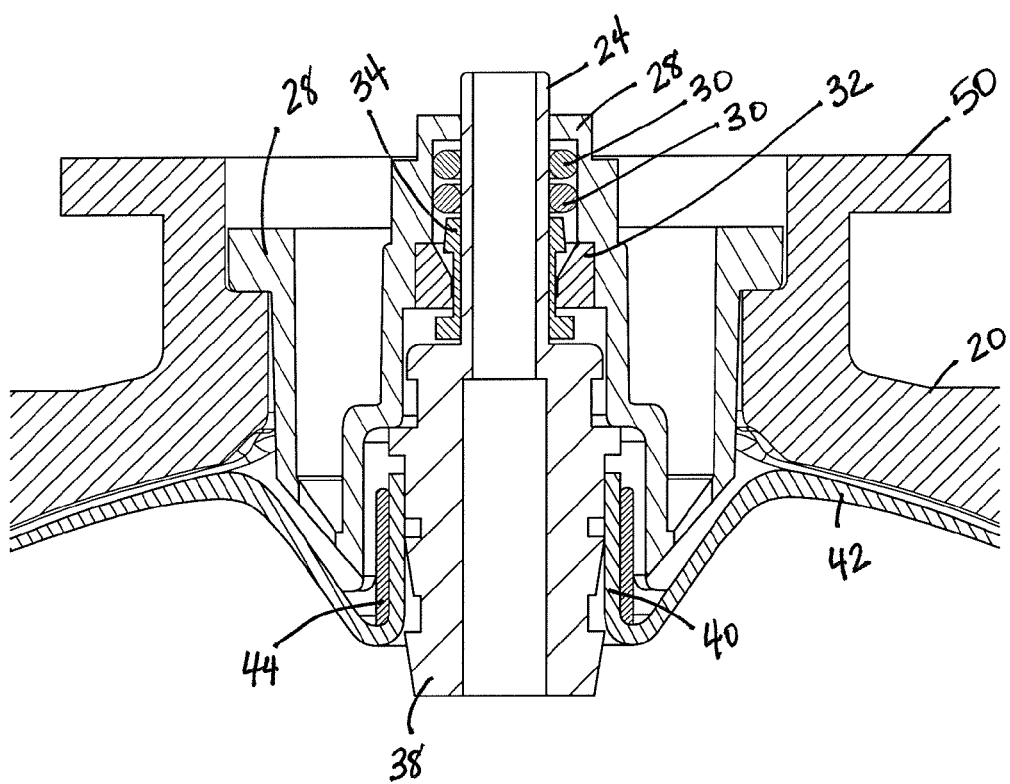
FIG. 5 is a cross section illustrating a top region of the tank of FIG. 1.

Now referring to FIGS. 2 and 5, details of the assembly 22 at the top of the exemplary embodiment may be seen. A molded member 28 has a pair of O-rings 30 therein which are retained in position by members 32 and 34. These members comprise a push-in fitting, commercially available from the John Guest Group of Companies. Member 32 of the fastener has stainless steel prongs 36 extending therefrom so as to be relatively easily pushed into member 28, but which dig in to member 28 to resist forces tending to push member 32 out of member 28. Similarly, member 34 also has stainless steel prongs molded therein which allow the product water delivery tube 24 to freely push therethrough, as shown in FIG. 5, without damage thereto, but which then resist removal of the product water tube once assembled as shown in FIG. 5.

The product water delivery tube, a plastic tube, has a barbed region 38 at the lower end thereof which fits into an entrance tube 40, integrally blow molded to the bladder 42. The entrance tube 40 for the bladder 42 is retained on the barbed end 38 of the product water tube 24 by a stainless steel squeeze ring 44 which is slightly radially compressed after the bladder 42 is placed in position on the barbed end 38 of the delivery tube 24.

Figure 1:
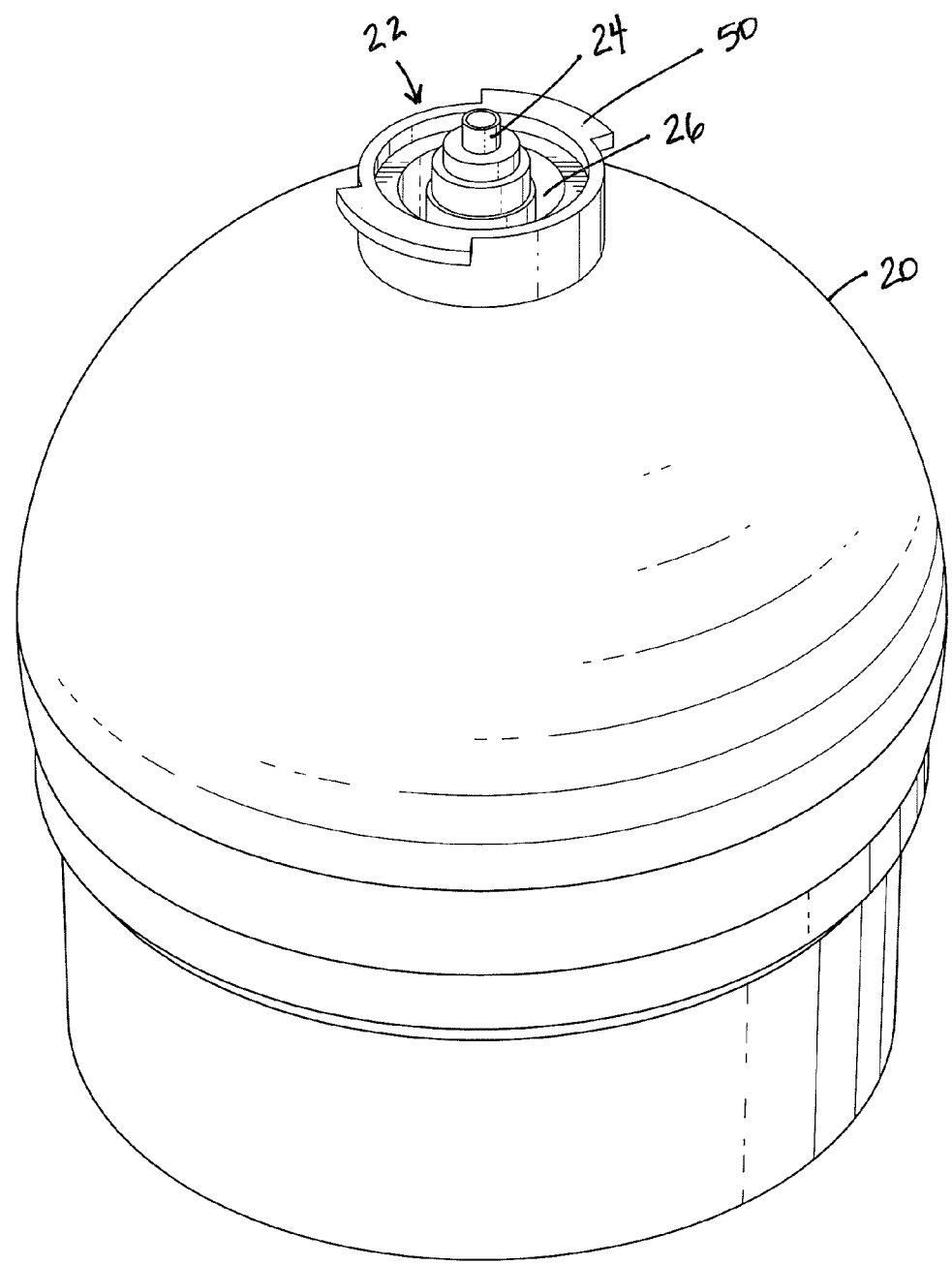
FIG. 1 is a perspective view of a reverse osmosis storage tank in accordance with the present invention.
Figure 3:
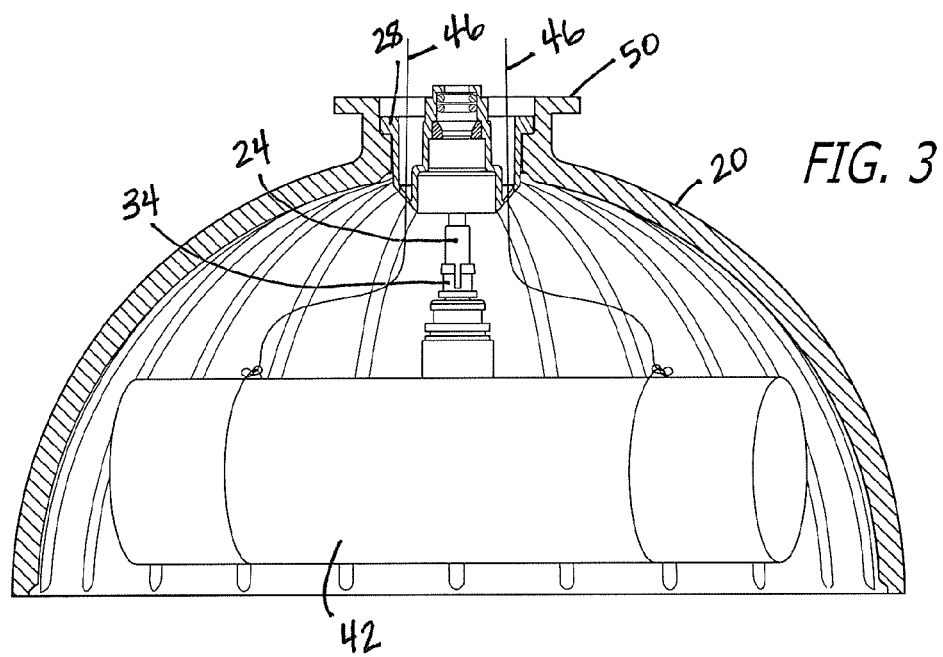
FIGS. 3 and 4 are partial cross sections showing the manner of assembling the upper half of the tank of FIG. 1 in a manner to allow welding of the two tank halves together without risking damage to the bladder therein.
Figure 4:
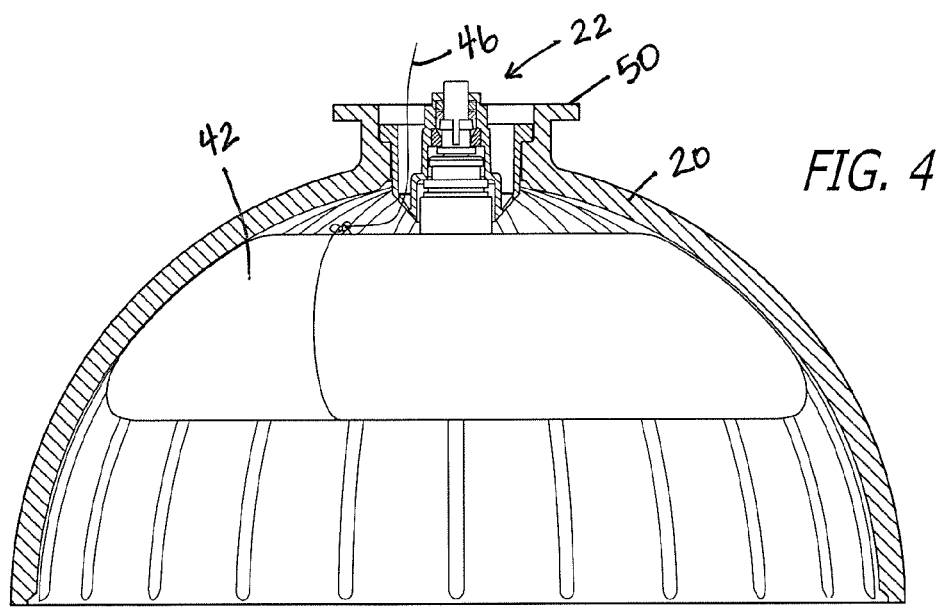

Now referring to FIGS. 3 and 4, a method of assembling the bladder and product water tube assembly into the upper half of tank 20 may be seen. First piece 28 with the part 32 of the push-in connector and O-rings 30 (FIG. 2) are assembled into member 28 and the assembly is pressed into the opening in the top of the tank 20, as shown in FIG. 3. This assembly defines a first opening 47 and second opening 49 in the upper half of the tank (or if the opening in the bayonet type connector 50 is considered the first opening in the first shell, the second opening 47 and third opening 49). Also the lower end of the product water tube 24 is attached to the opening in the bladder 42 (FIG. 5) and the bladder is rolled up as shown in FIG. 3 and temporarily "tied" by strings 46, which are passed through the squeeze water openings in member 28. Then with member 34 of the plug-in connector in position on the product water tube 24, the assembly at the top of the bladder is forced upward to push the product water tube 24 up through the O-rings, causing the barbs in the push-in connector piece 34 to retain the product water tube with respect thereto and to itself be retained by the part 32 of the plug-in connector to complete the top assembly 22 (FIG. 1). In this condition the bladder 42 is still rolled up and is temporarily retained by the strings 46, which may be tied together or otherwise fastened so as to not fall back within tank 20 and to be available for pulling to release the bladder after the welding of the two halves of the tank 20 together is completed.

Thus during the welding, whether hot plate welding or spin welding, the bladder is retained in the rolled up condition, well away from the central region being welded and well protected from the heat of that operation. After the welding is complete, then the strings 46 may be pulled, releasing the temporary "knots" holding the bladder in the rolled up condition and withdrawing the strings from the tank 20. This allows the bladder to be free so that when the reverse osmosis system is first used, the tank 20 will be filled with product water, expelling most air from the squeeze water side of the bladder, with whatever air is retained in the bladder being first discharged when product water is first dispensed. Then as more product water is made, any remaining air on the squeeze water size of the bladder will itself be discharged so that no air pockets remain in the system.

The strings 46 are preferably relatively strong so as to not break when being pulled for release, and can have somewhat self-lubricating qualities so as to easily slide over the bladder 42 when being released, though typical bladder materials themselves are relatively slippery. In that regard, the prior reference to being "tied" by the strings 46 was in quotation marks, as such knots may be simply the type one uses to tie one's shoes, or may, in fact, have no true knot at all, but rather simply one or two turns around the bladder with both ends of each of lines 46 being pulled out as shown in FIG. 3 and maintained in some tension as the center assembly 22 is assembled into position as shown in FIG. 4. The foregoing, of course, are merely examples of how one or more individual lines may be used to hold the bladder well above the middle of the tank 20 when the two halves of the tank are welded together to protect the bladder from the resulting heat, yet reliably release the bladder after the tank has been welded. While dropping a line into the tank would not be catastrophic, as the same would be on the squeeze water side of the bladder and perhaps could be fished out by evacuating the bladder, failure of a line to release the bladder, such as by breaking at a point within the tank before a knot holding the bladder was released, would be catastrophic. Actually, subjecting the bladder to a vacuum after rolling the bladder up may make retaining the bladder in the rolled up condition easier, or even retain the bladder without using strings to retain the bladder.

Figure 6:
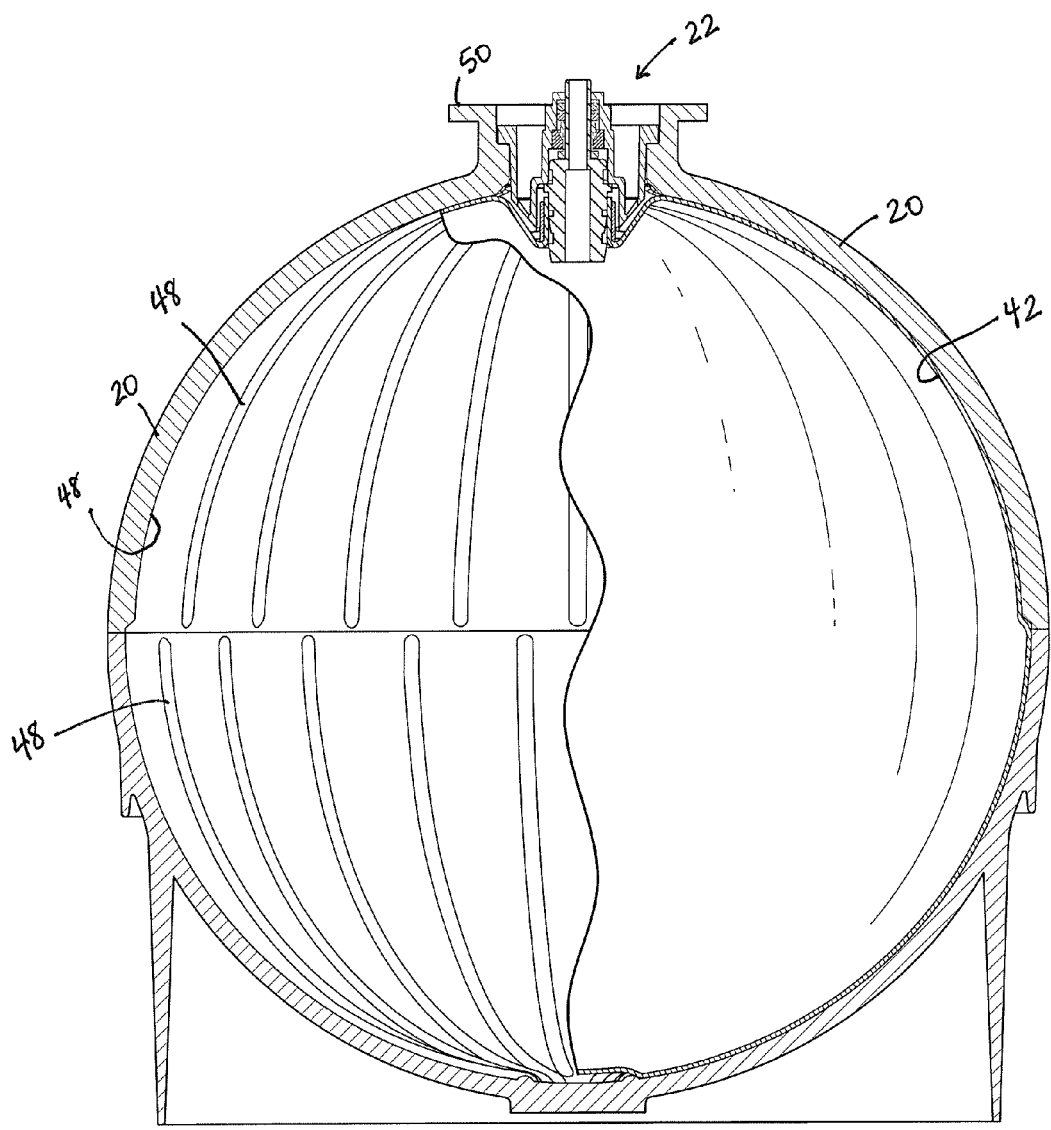
FIG. 6 is a cross section/cut away illustrating the finished tank of FIG. 1.

The final tank can be seen in cross section/partial cut away in FIG. 6. In that Figure, it may be seen that tank 20 has a plurality of inward projecting ribs 48, which are described in the foregoing patent, to locally hold the bladder away from the wall of the tank 20 to provide flow paths on each side of the ribs for squeeze water to avoid the hesitation in product water dispensing encountered in the prior art because of the inability to immediately get squeeze water between the bladder and the tank wall. Actually, while in the embodiment shown, ribs 48 are provided in both storage tank halves, which can provide a tooling advantage, ribs in the upper half of the tank 20, or at least the upper portion of the upper half of tank 20, should be adequate, as once a significant amount of dispensing has occurred from a tank full of product water, the rate at which the bladder must separate from the wall of tank 20 for further dispensing is relatively low, and in the prior art, the distracting hesitation in dispensing was encountered only when the storage tank was full or substantially full of product water.

In FIG. 6 the bladder 42 is shown on the right side of the Figure, though is cut away to show the ribs 48 on the left side of the Figure. The upper half of tank 20 appears thicker than the lower half of tank 20, though that is not the case. In particular, the cross section of the upper half of the tank 20 is taken through one of the ribs 48, whereas the lower half of the tank 20 is taken between ribs 48. This is because in welding of the two halves of the tank together, the relative angular orientation between the upper and lower tank halves is immaterial and not controlled. In that regard, the angular orientation of the upper half of tank 20 relative to the rest of the reverse osmosis system of the patent incorporated by reference herein is important because of the bayonet type connector 50 on the top half of the tank. however the bottom half of the tank is symmetrical about the vertical axis, and alignment of the ribs 48 between the upper and lower tank halves has been found to be not required.

The assembly method disclosed herein is particularly simple and allows assembly and sealing of the bladder and the tank prior to the welding of the two tank halves together, thereby avoiding having to use a thinner and less robust bladder, or alternatively, an inordinately large opening at the top of the tank for insertion of the bladder therethrough.

While a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A method of fabricating a bladder type storage tank comprising:
   forming first and second shells, which when joined together at a center region of each shell, form a tank enclosure;
   providing the first shell with first and second openings away from the center region of the respective shell;
   forming a bladder;
   coupling the bladder to the first opening in the first shell so that the bladder will be within the tank enclosure when the first and second shells are joined together at a center region of each shell;
   temporarily holding the bladder in a collapsed state away from the center region of the first shell with one or more strings and passing the strings through the second opening;
   welding the first and second shells together at the center region of each shell to form the tank enclosure; and
   withdrawing the strings to release the bladder.

2. The method of claim 1 wherein withdrawing the strings to release the bladder comprises removing the strings from the tank enclosure.

3. The method of claim 1 wherein the first and second shells are injection molded plastic shells.

4. The method of claim 3 wherein welding the first and second shells together comprises spin welding the first and second shells together.

5. The method of claim 3 wherein welding the first and second shells together comprises hot plate welding the first and second shells together.

6. The method of claim 3 wherein providing the first shell with first and second openings comprises:
   fabricating a plastic member and fastening the plastic member to the first shell, the plastic member defining the first and second openings in the first shell; and
   coupling the bladder to the first opening in the plastic member so that the first opening is in fluid communication with an interior of the bladder.

7. The method of claim 6 wherein the plastic member is pressed into the opening in the first shell.

8. The method of claim 6 wherein the bladder is coupled to the first opening in the plastic member using a push-in fitting.

9. A method of fabricating a bladder type storage tank comprising:
   forming first and second injection molded plastic shells, which when joined together at a center region of each shell, form a tank enclosure, the first shell having a first opening therein away from the center region of the respective shell;
   forming a bladder;
   fabricating a plastic member and fastening the plastic member in the first opening in the first shell, the plastic member defining second and third openings in the first shell, and wherein;
   coupling the bladder to the second opening in the plastic member so that the bladder will be within the tank enclosure when the first and second shells are joined together at a center region of each shell, and so that the second opening is in fluid communication with an interior of the bladder;
   temporarily holding the bladder in a collapsed state away from the center region of the first shell with one or more strings and passing the strings through the third opening;
   welding the first and second shells together at the center region of each shell to form the tank enclosure; and
   withdrawing the strings to release the bladder.

10. The method of claim 9 wherein withdrawing the strings to release the bladder comprises removing the strings from the tank enclosure.

11. The method of claim 9 wherein welding the first and second shells together comprises spin welding the first and second shells together.

12. The method of claim 9 wherein welding the first and second shells together comprises hot plate welding the first and second shells together.

13. The method of claim 9 wherein the plastic member is pressed into the opening in the first shell.

14. The method of claim 9 wherein the bladder is coupled to the second opening in the plastic member using a push-in fitting.

* * * * *